United States Patent [19]

Spruegel et al.

[11] Patent Number: 4,758,277
[45] Date of Patent: Jul. 19, 1988

[54] ADDITIVE FOR FRICTION COATING MIXTURES

[75] Inventors: Friedrich Spruegel, Munich; Peter Panster, Rodenbach, both of Fed. Rep. of Germany

[73] Assignees: Degussa Aktiengesellschaft, Frankfurt am Main; Tunap Industrie Chemie GmbH - Co. Produktions KG, Wolfratshausen, both of Fed. Rep. of Germany

[21] Appl. No.: 938,349

[22] Filed: Dec. 4, 1986

Related U.S. Application Data

[63] Continuation of Ser. No. 759,990, Jul. 29, 1985, abandoned.

[30] Foreign Application Priority Data

Aug. 1, 1984 [DE] Fed. Rep. of Germany ....... 3428347

[51] Int. Cl.$^4$ .............................................. C09K 3/14
[52] U.S. Cl. ...................................... 106/36; 523/155; 523/156

[58] Field of Search ................... 106/36; 523/155, 156

[56] References Cited

U.S. PATENT DOCUMENTS

2,387,872 10/1942 Bell ...................................... 427/350

FOREIGN PATENT DOCUMENTS

085876 5/1982 Japan .................................... 523/156

OTHER PUBLICATIONS

Chem. Abst. 60: 12998, Hoeppli et al., 1964, 27 Feb.
Chem. Abst. 68: 89602X, Fedorchenko.

*Primary Examiner*—Theodore Morris
*Attorney, Agent, or Firm*—Beveridge, DeGrandi & Weilacher

[57] ABSTRACT

A friction and abrasion controlling additive for friction coating mixtures, especially for the formation of brake pad materials is provided which utilizes $TiS_2$ as the additive.

22 Claims, 13 Drawing Sheets

Fig. 2 (II)

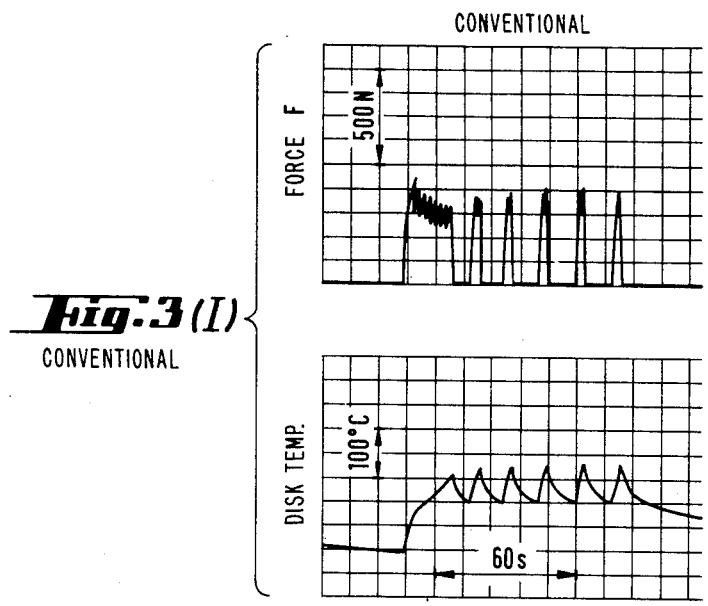
Fig. 3 (I)
CONVENTIONAL
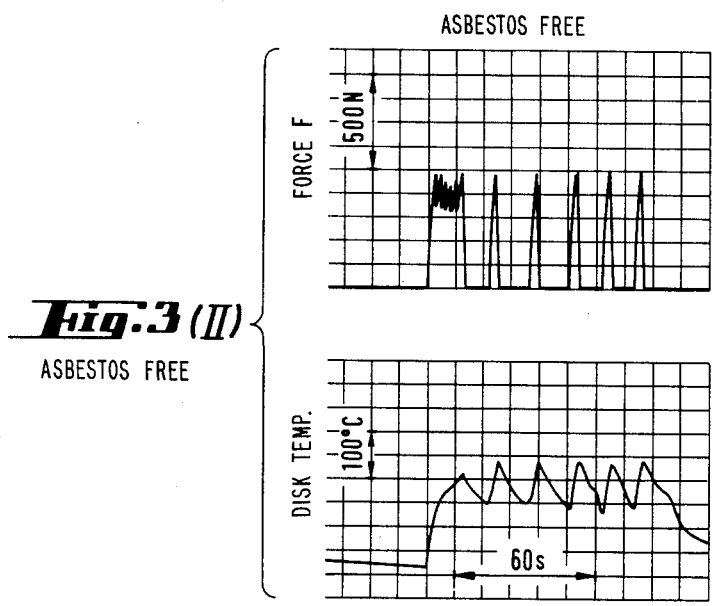
Fig. 3 (II)
ASBESTOS FREE

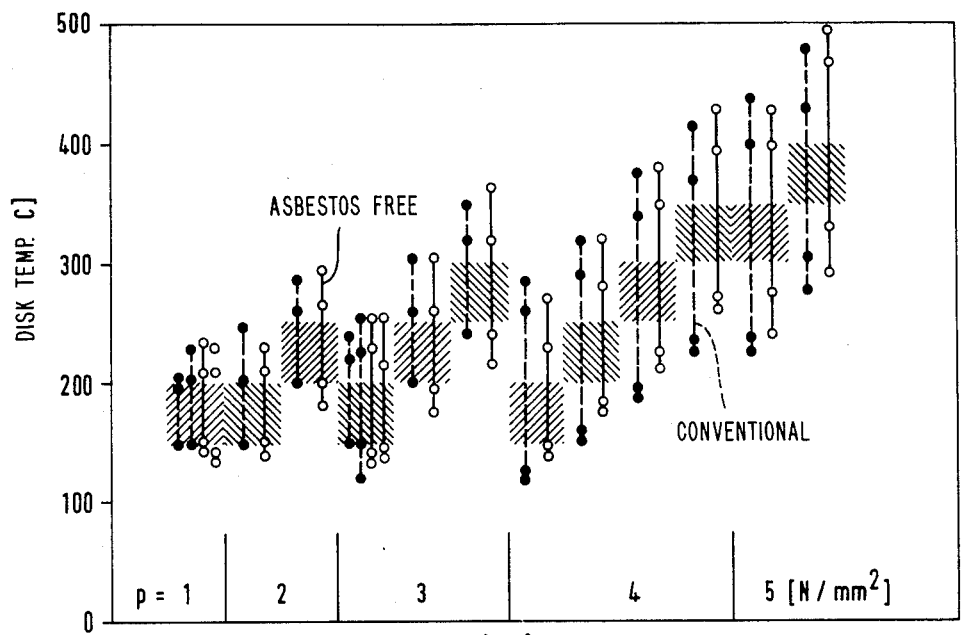
Fig. 4 (I)
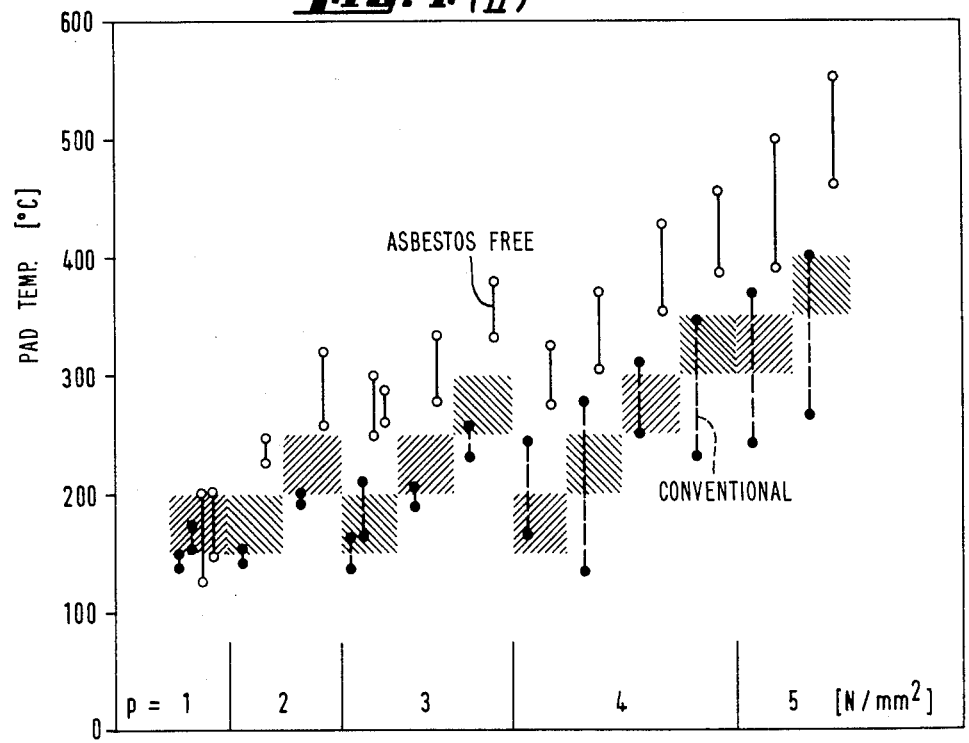
Fig. 4 (II)

Fig.6 (I)
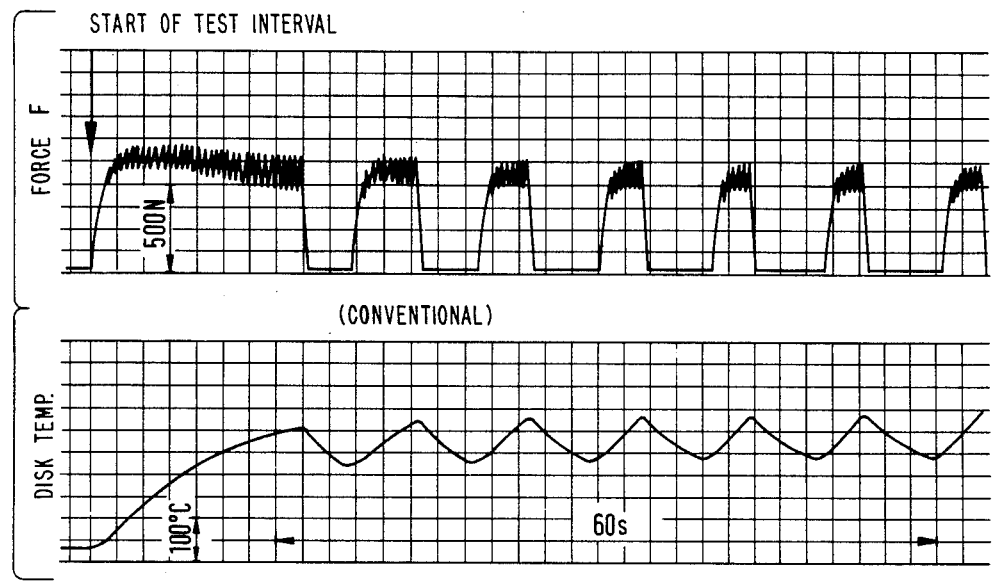
Fig.6 (II)
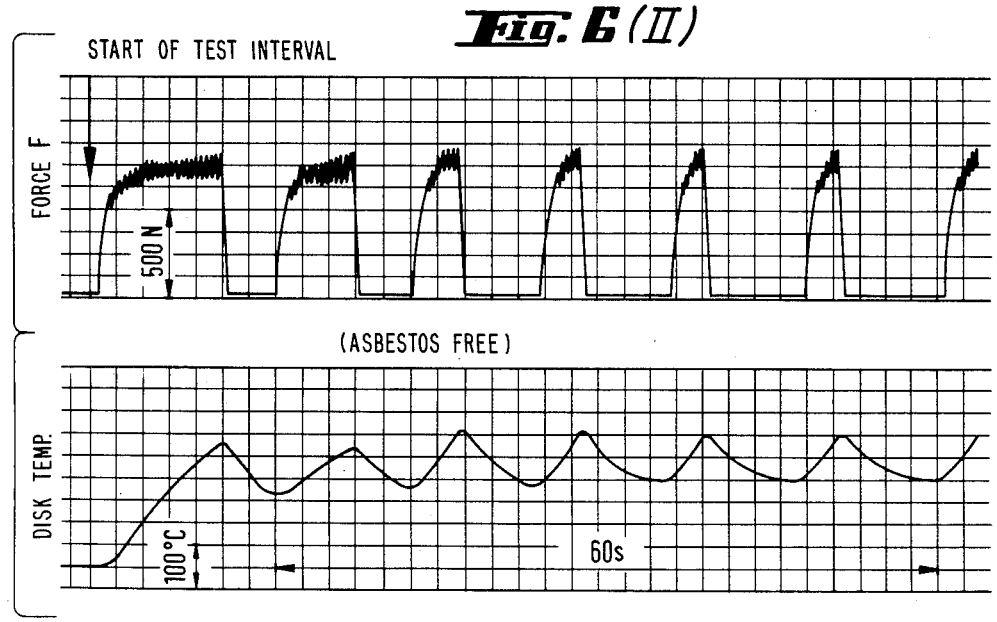

ADDITIVE FOR FRICTION COATING MIXTURES

This application is a continuation of Ser. No. 759,990 filed 7/29/85 now abandoned.

The present invention relates to an additive for friction coating compositions by means of which the attrition and abrasion thereof may be purposefully avoided. In particular, the additive further enables the utilization of asbestos free friction coating compositions for high load bearing friction surfaces in mechanical structural elements such as brakes, couplings, clutches, synchronized transmissions and the like.

It is previously known to use as starting materials for friction coatings, dry lubricants and fillers in the form of an additive to be introduced into such systems to produce a definite desired function such as, for example, a long lasting performance at a constant high coefficient of friction over a broad temperature range. At the same time, there is desired a reduced abrasion of the coating and its complementary element. Other indications such as a high sound level caused by backgliding or excessive development of residue, in particular on the complementary element should also be largely reduced and avoided.

Such an additive includes, for example, graphite, a ceramic powder, a metal or metal oxide powder and a heat hardenable phenolic resin and is utilized as a conventional friction mixture in amounts of about 1.5 to 20% by volume as shown in the Netherlands Patent Publication No. 66 12 920.

Conventional friction coating compositions contain as the principal ingredient materials with a high friction coefficient, structure building materials such as asbestos fibres, heat dissipating materials, organic or inorganic binder materials as well as abrasion and dust controlling additives as individual materials or in an admixture.

As an individual substance there has already been purposed, for example, $MoS_2$ for the so-called semimetallic coatings in which the asbestos fibres are replaced by metal-containing components; see SAE paper 790717 entitled "Controlled Friction Additives For Brake Pads And Clutches" by H. M. Schiefer and G. V. Kubczak.

The asbestos containing friction coatings which have been primarily used heretofore present a considerable safety hazard, which was only relatively recently recognized, because of the dispersal of fibrous asbestos dust so that today everywhere one is urged to eliminate asbestos in all products in which there is a risk that the asbestos can be set free into the atmosphere.

To create asbestos free friction coatings there was presented the problem to utilize suitable products which would compensate for the complex working performance of the asbestos component in a coating. In many cases, constraints have necessitated very substantial changes in the composition of the friction coating, for example, in place of asbestos the use of cotton-, glass- or carbon fibres, aramid fibres, wollastonite fibres, steel wool, ceramic fibres, bentonite, mica or diatomaceous earth; see Industrial Research and Development, July 1983, page 88ff. All of the attempted endeavors which have been carried out thus far to obtain partially or completely asbestos free friction coatings with the desired physical property characteristics of asbestos containing friction coatings have led to products which have attained the desired high standard in abrasion and wear resistance to a limited extent.

According to the invention there is now provided a abrasion and dust eliminating additive for friction coating compositions, and particularly those friction coating compositions which are free of asbestos which permit the obtaining of the desired goal and which in many cases even exceed those desired attributes.

A feature of the invention resides in an additive for friction coating compositions which is characterized in that it consists wholly or partially of titanium sulfide, $TiS_2$.

It is very surprising that these goals are obtainable with the additive of the present invention because $TiS_2$ is an air and moisture sensitive material as well as a material which is relatively easily thermally decomposed.

So, for example, there occurs even at room temperature a partial oxidation to an oxidized compound and by contact with moisture a release of hydrogen sulfide. With a thermal load in air a considerable decomposition occurs even at temperatures of 150° C. and even under a protective gas atmosphere a distinct decomposition with release of sulphur can be observed at temperatures above 250° C.

In this it is to be noted that it is just these distinctive properties of the $TiS_2$ which are advantageous in a friction coating composition when this material is used in a relatively low concentration, advantageously in the range of up to 2 weight percent, in a friction coating mixture.

In addition to that and depending upon the basic composition of the friction coating, the $TiS_2$ can be introduced either as such or in the form of an admixture with other materials, in particular the so-called solid lubricants such as antimony sulfide, aluminum phosphate and others.

A particular advantageous embodiment of the invention arises in that the friction and abrasion controlling additive is created from a mixture of $TiS_2$ with a sulfide of the 2. secondary group of the Periodic Table, a phosphate of magnesium, calcium, boron, aluminum, copper or iron and synthetic graphite.

Advantageously utilized for the purpose of the invention are sulfides of the 2. secondary group of the Periodic Table which includes, for example, ZnS with a Wurtzite structure, CdS with a Wurtzite structure (for example, obtainable through sintering of the hexagonal crystallized form) as well as HgS in the form of the hexagonal cinnabar.

Among the phosphates of magnesium and calcium are, for example, the compounds $Mg_3(PO_4)_2$, $Ca(H_2PO_4)_2$, $Ca_3(PO_4)_2$, $Ca_4P_2O_9$ and $Ca_5P_6O_{20}$, the phosphates of boron and aluminum having the formula $BPO_4$, $AlPO_4$ as well as aluminumpyro and polyphosphate, and the phosphates of copper and iron having the structures $Cu_3(PO_4)_2$, $Cu_2P_2O_7$, $FePO_4$, $Fe_2P_2O_7$ and $Fe_4(P_2O_7)_3$ are suitable which are particularly suitable in view of their water insolubility and temperature stability.

Basically, compounds containing water of crystallization can also be used in the brake pad mixtures because during the fabrication of the pad the heating temperatures that are used result in a dewatering whereby the water free salts are rendered insoluble.

As a result of the high thermal stability, the zinc sulfide having the Wurtzite structure can be used as the sulfide and the tricalcium phosphate, $Ca_3(PO_4)_2$, can be used as the phosphate with particularly advantageous results.

A variation of the additive of the present invention for the fabrication of outstanding asbestos containing friction coating compositions and, more particularly, outstanding asbestos free friction coatings resides in a composition having the following formulation:

| | |
|---|---|
| 5-30 weight percent | $TiS_2$ |
| 10-30 weight percent | ZnS (Wurtzite structure) |
| 5-30 weight percent | $Ca_3(PO_4)_2$ |
| 10-80 weight percent | synthetic graphite |
| and preferably | |
| 10-15 weight percent | $TiS_2$ |
| 10-30 weight percent | ZnS (Wurtzite structure) |
| 10-15 weight percent | $Ca_3(PO_4)_2$ |
| 40-70 weight percent | synthetic graphite |
| and most preferably | |
| 8-12 weight percent | $TiS_2$ |
| 20-25 weight percent | ZnS (Wurtzite structure) |
| 8-12 weight percent | $Ca_3(PO_4)_2$ |
| 51-64 weight percent | synthetic graphite. |

Further objects of the invention reside in the method of utilization of the additive of the present invention in an asbestos free friction coating and, in addition, the $TiS_2$ containing friction coating compositions and friction pads and bodies obtained thereby.

The asbestos free friction coatings obtainable through utilization of the additive of the present invention exhibit a higher friction value as compared to conventional asbestos containing coatings with equivalent reduction of abrasion dust and a higher temperature resistance with long term use. As compared with previously known asbestos free coatings which characterize themselves in a performance which attains only about 80% of that which is optimal for an asbestos containing coating, the advantages obtained by the present invention are therefore even greater. This fact can be demonstrated below in connection with a comparative example wherein an asbestos free friction coating containing an additive in accordance with the present invention is compared with a conventional asbestos containing friction coating of the highest quality in the operation under test conditions which comes very close to the conditions in actual usage.

EXAMPLE 1

For the conventional asbestos containing abrasion coating, there was used a backside-carrier-supported brake pad of the type number 2840687239 series of the Jurid Company, 2057 Reinbek which is the replacement part for the Corsa automobile.

For the asbestos free friction coating, there is used a backside-carrier-supported brake pad of the type PA 516B7 of the Textar Company, Leverkusen, Germany, which has among conventional ingredients the following components present in conventional particle size of about 40 microns (μm):

0.47 weight percent $TiS_2$
0.92 weight percent ZnS(Wurzite structure)
0.30 weight percent $Ca_3(PO_4)_2$
2.12% weight percent synthetic graphite As the complimentary brake element there was used an automobile brake disc of a production series with a measurement of 234 mm. outside cross sectional measurement, 141 mm interior cross section and 10 mm thickness.

The Tribologic Model System Utilized

For the experimental conditions there was used as the basis of the test a stretch of roadway which has many curves by which in a course of frequent brakings with little change in velocity, high temperatures can be created dependent on the duration of the pressure application and pressure release phases. Thereby, there was selected a driving velocity of an average value of 100 km/hr which has a relative velocity between the brake pads and the disk of about 10 meters per second. The range of surface pressure ranged from 1 to $6N/mm^2$. The surface area of the brake was $20 \times 30$ $mm^2$.

The construction and operation of the model system, conditions of the experiment and resulting values are described in further detail in connection with the drawings in which:

FIG. 3 shows the relationship between disk temperature and loading and temperature variations.

FIG. 4 shows the relationship of temperature on the disk and the pad.

FIG. 6 shows the braking cycle of the abrasion experiments at $3N/mm^2$ and 250°-300° C.

CONSTRUCTION AND HANDLING OF THE MODEL SYSTEM

Figure 1:
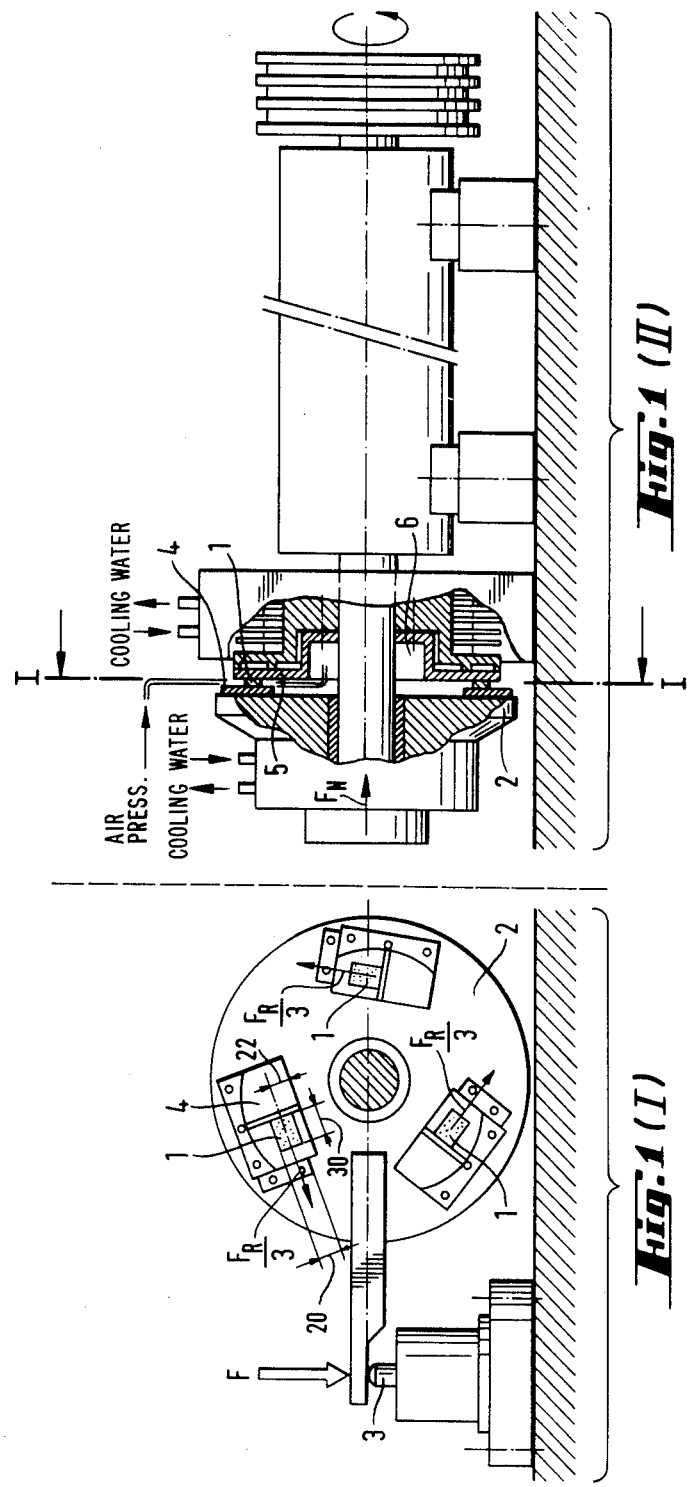
FIG. 1 is a two part sketch of the principle of the model system which shows at the left of the dashed separation line in part I a view of a brake pad carrier with three brake pads and its arrangements, and at right hand side of the dashed separation line shows part II which is a cross section through the entire model system.

In accordance with FIG. 1 there are three brake pads 1 oriented at 120° with respect to each other mounted on a water cooled pad carrier 2 above a floating measuring rod 3, and for supporting of the braking moment, over an impact stopping strip. 4. They are pneumatically pressed against the rotating brake disk 5. The outline surface of the disk brake carrier is reduced to two small ring rods having a ring nut therebetween in order not to prevent a rapid heating up of the disc brake by a too rapid heat dissipation. A water cooling of the disc carrier prevents an undesired warming up of the bearing plates and enhances the dissipation of heat after the braking cycle. During the pressure releasing phase pressurized air is blown into the sink 6 which is formed in a portion of the braking disc 5. As a result, there is obtained together with the heat dissipation through the use of the cooling water a rapid cooling off similar to that which is obtained in the automobile as a result of wind velocity. Because of the disc brake thickness and because only a few seconds are required for the recurrence of the braking the heating up of the braked disc side through the heat conduction of the experimental machine is practically not influenced at all. The temperature variation between the two limiting values is accomplished through the use of a thermal element which is sliding on the braking disc. The friction strength $F_R$ is determined with the help of a lever ratio and also with the use of a pressure measuring cell to register the strength F.

The experiental apparatus is so laid out that the experiment for determination of the abrasion and the wear can be accomplished with constant equal velocity of 10.5 meters per second, a surface area pressure about 1 to $6N/mm^2$ and a disc temperature limit (as well as a pad temperature limit) in controlled ranges locations up to a maximal upper limit of 600° C. in a step wise manner.

The time duration of the individual brakings at constant gliding velocity and surface pressure is dependent upon the temperature increase of the disc from a lower to an upper limiting temperature. Upon obtaining of the upper limiting temperature, the release of the loading follows for a sufficient period of time until through the conduction of heat the lower limiting temperature value is again attained.

Experimental test conditions

With the abrasion experiments the control according to the measured disk temperature was applied which has proved itself to be the determining factor in comparison with the control according to the determined pad temperature because it is independent of the system. In addition to the value of the control, the maximum temperature of the other partners is also measured therewith.

Figure 2:
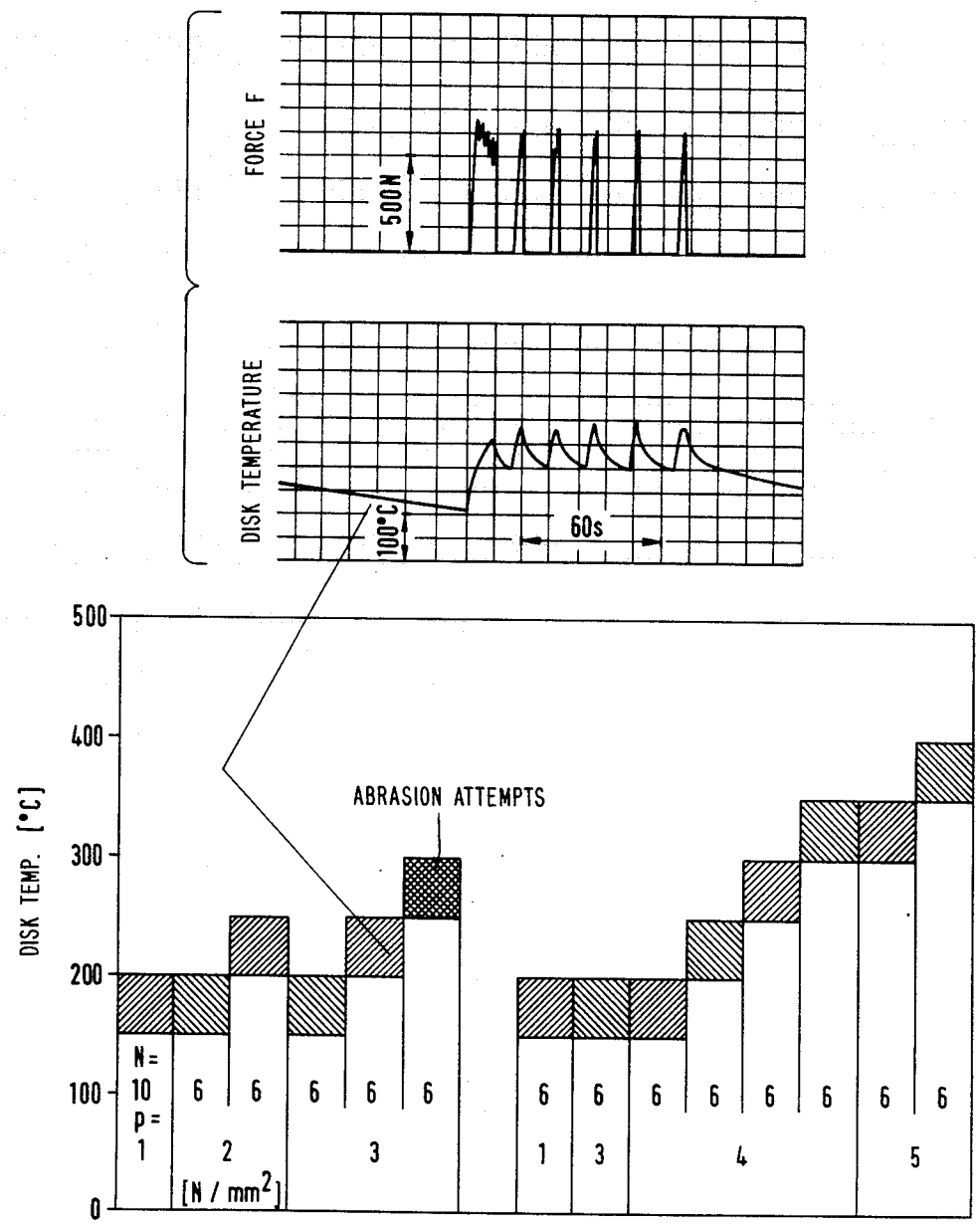
FIG. 2 shows the experiment of the program for the abrasion and wear investigations.

According to FIG. 2 the pressure-on-surface-area-range is determined to be 1 to $5N/mm^2$ and the disc limiting temperature is set in the range of 150°–200° C., 200°–250° C., 250°–300° C., 300°–350° C. and 350° to 400° C. Repeat experiments with 1 to $3N/mm^2$ were undertaken in order to determine eventual changes in the relationship of the abrasion on the basis of the previously carried out brakings. The number of brakings within the field of parameters ranged from 10 down to 6 brakings per parameter combination.

The conditions for the wear experiments were determined on the basis of this information which was obtained from the abrasion experiments. As realistic but sharp limits there was chosen the surface pressures of $3N/mm^2$. The control was performed in accordance with the disc temperature in the range of 250°–300° C. as shown in FIG. 2.

The wearing away of the breaking pads was determined through intervals with the measurement of the remaining height of the pad and for the control through weighing of the individual pads.

Both types of pads were measured under identical condidtions. During the course of the abrasion and wear experiments there were utilized for both pad embodiments new disc brakes. With the abrasion experiments the projecting of the disc brake ranged as compared with the pad amounted to 2 mm, and with the wear experiments amounted to 3 mm.

For the evaluation of the behavior of the entire system braking pads/braking disc the temperature of the pad and of the disc and the friction value including the abrasion strength as well as the wearing of the breaking pad were taken into consideration.

Results of the Experiments

With the evaluation of the measured temperatures in the abrasion experiments, there was a comparison made in accordance with FIG. 4 for the respective registered control temperatures between the upper and lower limiting temperatures and their distribution, for the temperature of the respective other partner only the upper limiting value with the hereby determined distribution and of the preselected temperature limiting values. From FIG. 4 it is to be noted that there is a distinct difference between the brake pad which is free of asbestos and which has an additive in accordance with the present invention and the conventional brake pad. The asbestos free brake pad, at the chosen control of the disk temperature, is subjected to a higher thermal loading as compared with the conventional one.

Figure 5:
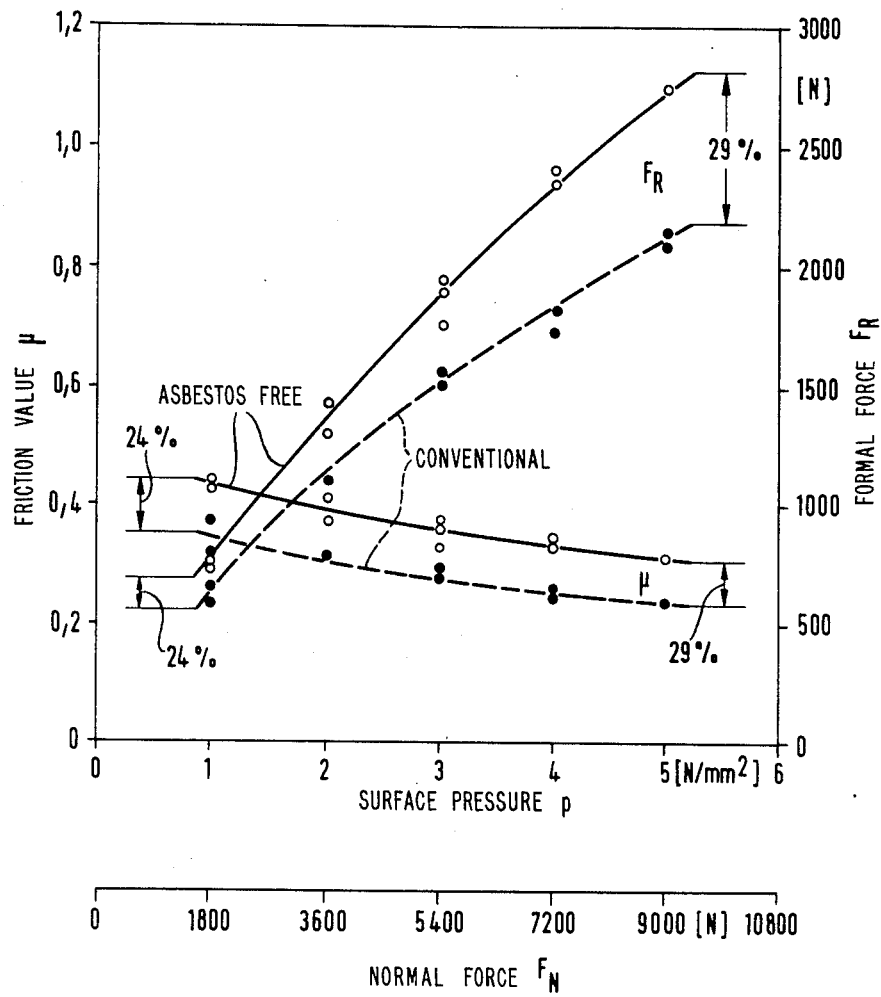
FIG. 5 shows the friction value and friction strength in dependence of the surface pressure.

The abrasion strengths, $F_R$, for the asbestos free pad without exception is higher than for the conventional one and increases with increasing normal strength $F_N$ in a digressive manner as shown in FIG. 5. The therefrom resulting friction values, $u = F_R/F_N$ therefore decreased. They decreased themselves with an applied pressure of $P = 1$ to $5N/mm^2$ in the case of a conventional pad from about 0.35 down to about 0.24 whereas with an asbestos free pad from about 0.43 down to about 0.31.

In the wear experiments, the resulting loading and temperature performance in accordance with a surface pressure of $3N/mm^2$ and a temperature range of 250°–300° C. are shown in FIG. 6.

Figure 7:
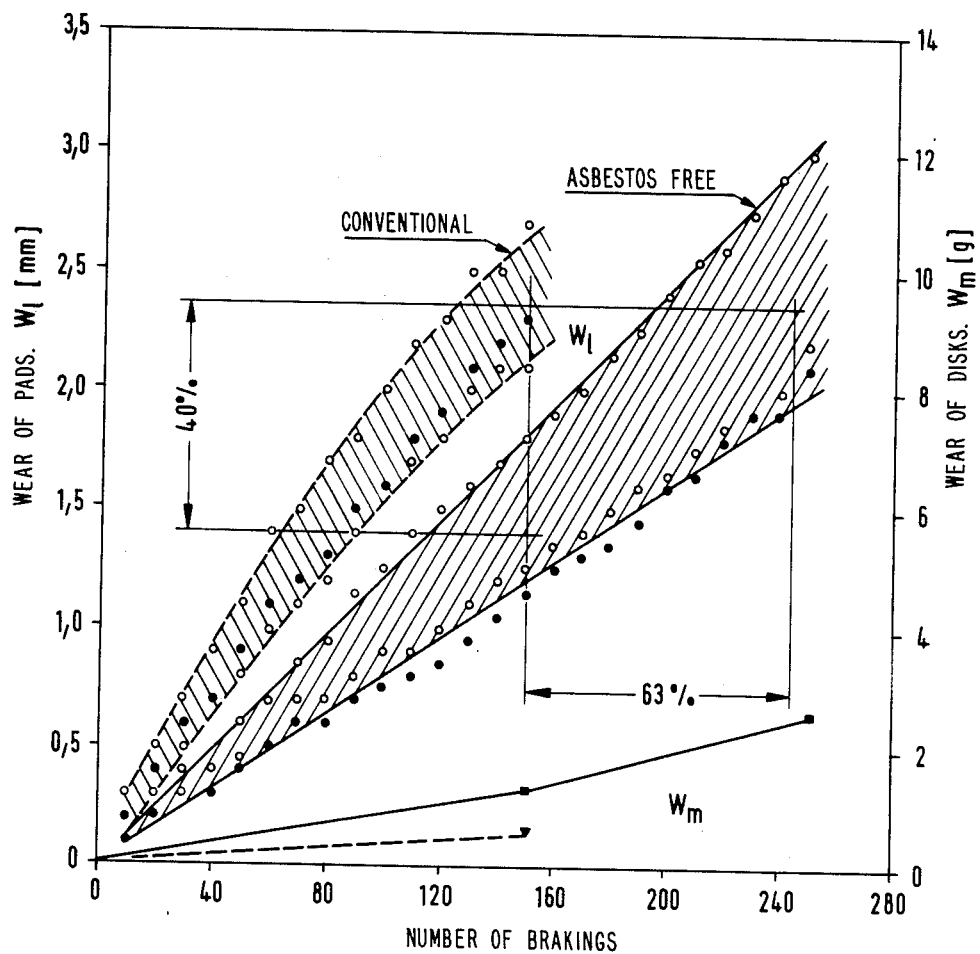
FIG. 7 shows the wear of the braking pads and the braking disks in dependence upon the count of the number of brakings.

The wear of the brake pad shows an almost linear relation to the number of brakings and is always higher than with an asbestos free pad as shown in FIG. 7. The distribution band is caused by the different wearing of the individual pads. At 150 brakings there was obtained with the asbestos free pad a 40% reduction in wear (arithmetic average with distribution bands of 150 brakings) as compared with the conventional pad. Using equal wear (arithmetic average of the distribution band with equal wear) as a basis, this means that one could have carried out 63% additional brakings with the asbestos free pads.

Therefrom it is apparent that the asbestos-free brake pad which contains the additive of invention provides continuously a distinct higher friction number within the examined loading limits of $p = 1$ to $5N/mm^2$. At lower loads the friction number is 22.9% higher and at higher loads it is 29.2% higher.

The decrease in the mass of the pads in dependency of the number of the breakings results the same kind of interdependence.

EXAMPLE 2

The effect of $TiS_2$ on the abrasion performance and wear characteristics of a model composition for an asbestos free brake pad was compared to one containing $MoS_2$ in a model composition for an asbestos containing pad. The particle size ranged for both materials up to a maximum of 40 $\mu m$. The comparison was carried through here on an electronically operated lubricating material testing machine, Lubrimeter (of the brand IN-CHEM). There was carried out a determination of a material comparison by subjecting the materials to a rotating sliding transverse motion device whereby the surface area geometry and thereby the contact surfaces corresponds into a linear contact.

For the conventional asbestos and MoS₂ containing brake pad A the following composition was utilized.

| Brake Pad A | |
|---|---|
| MoS₂[5] | 0.80 wt. % |
| Graphite[1] | 16.24 wt. % |
| ZnS (Wurtzite-structure) | 2.40 wt. % |
| Ca₃(PO₄)₂ | 0.56 wt. % |
| Phenolic resin (novolac)[2] | 20.00 wt. % |
| Asbestos fibers[3] | 30.00 wt. % |
| Steel wool powder[4] | 30.00 wt. % |

[1]Comprising 12.00 weight percent in natural graphite type AF 96, Kropfmuhl Graphite Works and 4.24 weight percent synthetic graphite type KS44, Lonza Company, Basel, Switzerland.
[2]Type RP 229 of the Bakelite Company.
[3]Fiber length < 1,000 μm, type FP Grolmann Company.
[4]Fiber length < 500 μm, Eckart-Werke, Fuerth, Germany.
[5]Natural MoS₂ 40 μm, Starck Company, Berlin.

Preparation of the MoS₂ containing brake pad mixture and fabrication of the brake pad:

The utilized raw materials in powder form were stirred into a homogenuous powdery mixture. The powdery mixture was then prepressed at about 10N/mm² in order to reduce the large volume. The pressed powdery body was then heated in a mold at 180° C. and 25N/mm² for 30 minutes, to obtain a sintering and hardening of the phenolic resin. The crude material was then removed and subsequently tempered in a drying cabinet at 180° C. for 8 hours. The finished raw material was then finished on a lathe for the little roll on the lubrimeter.

For the asbestos free brake pad B containing the additive TiS₂ in accordance with the present invention the following composition was utilized:

| TiS₂ | 0.40 wt. % |
|---|---|
| Graphite (synthetic) | 2.12 wt. % |
| ZnS (Wurtzite-structure) | 1.20 wt. % |
| Ca₃(PO₄)₂ | 0.28 wt. % |
| Phenolic resin (novolak)[1] | 20.00 wt. % |
| Brass powder flakes[2] | 50.00 wt. % |
| Fibrous material (organic)[3] | 6.00 wt. % |
| Mica powder[4] | 20.00 wt. % |

[1]Type RP 229 of Bakelite.
[2]Type MR 70 AS 71 - Eckhart-Werke.
[3]Type Kevelar 29 (milling flocs 0.8 mm) - Black Forest Textiles.
[4]<100 μm Type FDP/4 - Grolmann, Duesseldorf, Germany As in orientation pre-trials there was already determined that the TiS₂ has a higher performance and there was determined for the desired comparative experiments to use TiS₂ in half of the amount of introduced MoS₂ in order to obtain the measuring results within a uniform framework.

The production of the TiS₂ containing brake pad mixture and the fabrication of the brake pad therefrom is carried out in the same way as in connection with the conventional brake pad A which is described above.

In order to determine if various disc brake materials also have an influence on the results, the comparative measurements were extended to:

Cast iron casting material GG26 (Conventional material - Example 2.1).
A hardened steel (Rockwell hardness 63) - Example 2.2.
Refined steel V₂A high performance material -

-continued
Example 2.3.

Structure and handling of the experimental apparatus, the experimental conditions and results obtained may be seen from FIGS. 8 to 13.

Construction and Handling of the Electronic Lubrimeter Test Machine, System INCHEM Two stationary small rolls of the pad to be tested of 8×12 mm are pressed against a self-rotating pin of 24×67.5 mm with a pre-selected force value. The loading of the system is adjustable through choice of the Pressing strength (Loading steps of 1 to 10, each of 750N), circumferencial velocity of the pin and abrasion) distance=testing duration.

The chosen combination of the testing parameters is held constant during the entire experimental run. During the testing run the abrasion strength and the course of temperature which effect the testing body are digitally monitored and simultaneously recorded.

At the end of the test run the wear marks on the test bodies were visually determined, optically measured and the surface mechanically scanned.

Mechanical Part

The pin-testing bodies are clamped between two points on the main driving shaft. The small rollers of the material to be tested are clamped into the fitting for the measuring of abrasion strengths. The main axle is driven by a controllable motor. The pressure of the test rolls takes place with a lever arm and spring. The temperature on the abrasion surface is measured by a thermal element.

| Control and Recording | |
|---|---|
| Number of revolutions | 50 to 1500 per minute. |
| Pressing strength | 0-7500 N in ten loading steps of each 750 N |

For the recording of the experimental temperature and the abrasion values there may be a used a two-canal XY recorder with an adjustable time advance.

For the measurement of the wear and depth of roughness a surface tactile apparatus is chosen. The profile recordings can be directly evaluated. The wear marks on the small rolls are measured in millimeters and with the assistance of a table of abrasion can be calculated in miligrams.

Test Bodies

A simple testing body form as small rolls suffices for the finishing of the test bodies formed of the brake pad materials with limited expenditure.

Carrying Through of the Testing

The test bodies were carefully cleaned in boiling liquid gasoline 2 DIN 51636 and dried. In the cleaned test holder the test bodies are installed. The rotation speed of the main axle is selected and initiated and after that the previously chosen load is brought onto the test bodies. The test run after arriving at the determined time period is automatically ended. After the experimental run the test bodies are cleaned and measured.

EXAMPLE 2.1

For evaluation of the differences in friction, wear and temperature behavior there is carried out the following comparative tests on the Lubrimeter:

| Test conditions: | |
| --- | --- |
| Stage of Loading | 1 (750 N) |
| Rotational speed | 1400 rpm equals approximately 1.75 meters per second sliding velocity |
| Material of the pins: | disc brake material from cast iron casting |
| Material of the rollers | (A) $MoS_2$-containing pad (B) $TiS_2$ containing pad |

The Lubrimeter was brought at room temperature to the indicated speed. Then the load was applied and when achieving a pin temperature of 150° C. this was decreased. This test was carried out with the pins twice and once with the rollers. After each test the test bodies were removed and newly measured.

Test Results

On the basis of the depth of roughness measurements on the pins both before and after the abrasion-wear by the small rollers which are formed from the brake pads to be compared there was taken the average roughness value $R_a$ and the average depth of roughness, $R_z$. The average roughness value is the arithmetic average of all distances of the depth of roughness profile R from a central line, the average depth of roughness is the average value of the individual roughness depths of 5 individual test distances, each following after the other.

Furthermore the average breadth of the wear on the test bodies formed of the brake pad materials which are to be compared was determined; thereby, the width of wear is measured which on the average arises by wear of a line on the surface.

Also the abrasion/temperature diagrams for the two brake pad compositions were determined.

| 1. Depth of roughness on the pins | $R_a$ | 1.93 μm |
| --- | --- | --- |
| before abrasion test | $R_z$ | 12.18 μm |
| 2. After abrasion tests | $R_a$ | 0.91 μm |
| with $MoS_2$ containing pad | $R_z$ | 6.51 μm |
| with the $TiS_2$ | $R_a$ | 1.30 μm |
| containing pads | $R_z$ | 9.54 μm |
| 2. Average wear breadth on the brake pad testing bodies. | | |
| $MoS_2$ containing pad | | 2.3 mm |
| $TiS_2$ containing pad | | 2.4 mm |
| 3. Abrasion/temperature diagram | | |

Figure 8:
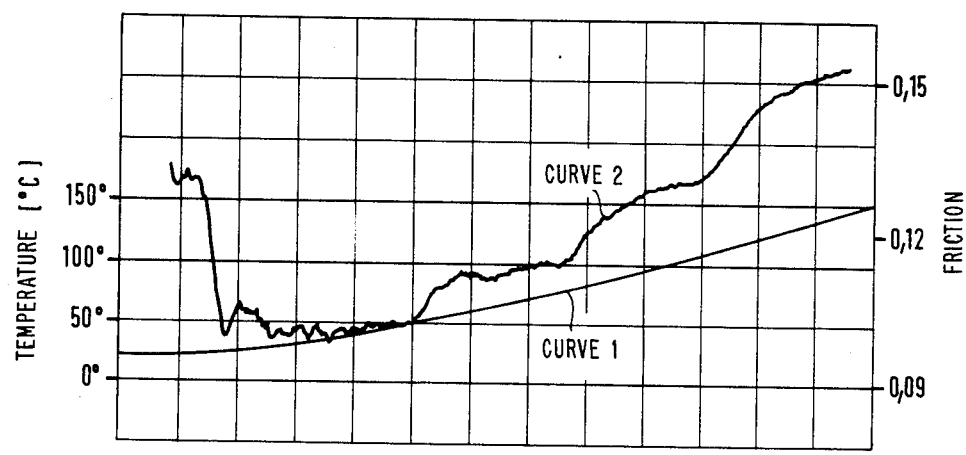
FIG. 8 is a friction/temperature diagram for the $MoS_2$ containing brake pad (brake disc cast iron casting)
Figure 9:
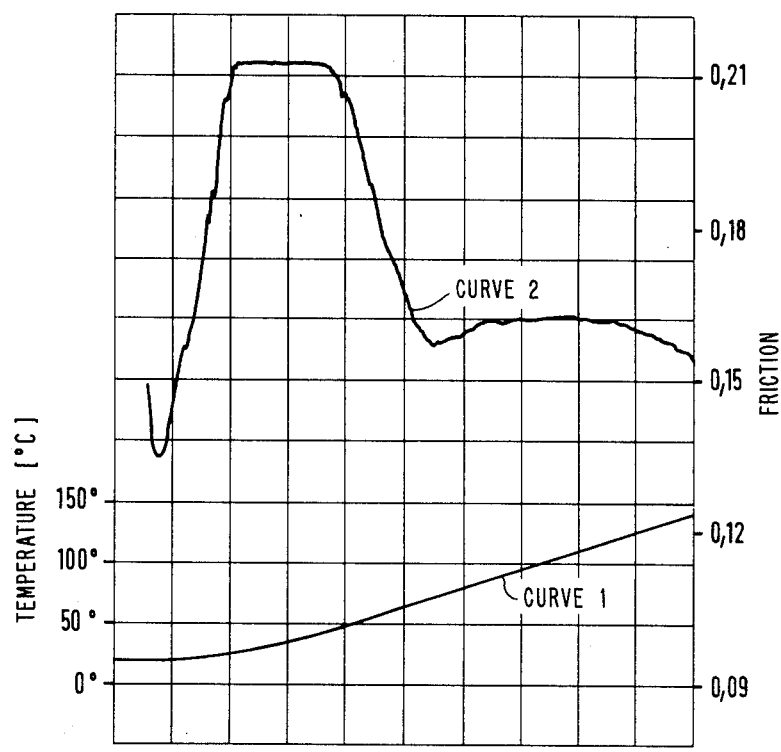
FIG. 9 is a friction/temperature diagram for the $TiS_2$ containing brake pad (same brake pad as in FIG. 8)

FIG. 8 provides the relationship between friction value and temperature with an $MoS_2$ containing pad and FIG. 9 the same relationship with a $TiS_2$ containing pad. In the diagrams, a paper travel rate of 1 centimeter is equal to a time of 3 seconds.

| Curve 1 shows the course of temperature (1 cm ≙ 50° C.); Curve 2 shows the course of the friction number (1 cm ≙ 0.012). |
| --- |

With approximately the same wear of brake pad material and approximately equal roughness on the disc brake material, the $TiS_2$ pad shows up to 50% higher friction values as well as essentially faster increasing friction values.

These results indicates that under emergency braking conditions, essentialy better slowing down times are obtainable because the full friction loading with a $TiS_2$-pad is arrived at in an average of 6.3 seconds whereas with the $MoS_2$ pad this is only obtained in an average of 31.5 seconds.

EXAMPLE 2.2

The determination of the differences in friction, wear and temperature values was carried out on the lubrimeter in accordance with the following comparative tests.

| Experimental Conditions: | |
| --- | --- |
| Stage of Loading: | 1 (750 N) |
| Rotational speed: | 1400 rpm (equals approximately 1.75 meters per second velocity) |
| Material of the Pins: | A steel which is hardened ($15Cr_3$) |
| Material of the rollers: | (A) $MoS_2$ containing pad (B) $TiS_2$ containing pad. |

The lubrimeter was brought to room temperature at the indicated rotational speed. Thereupon the load was applied and after 22.5 seconds of running time the load was removed. This experiment was carried out 1 time with the pins and with the rollers. After that the test bodies were removed and newly measured.

Test Results

There was again measured the depth of roughness of the pins both before and after the application of the test, the wear breadth on the brake pad and testing bodies, and also the friction/temperature diagram was determined.

| 1. Roughness depth on the pins before abrasion tests | $R_a$ | 0.70 μm |
| --- | --- | --- |
| | $R_z$ | 6.00 μm |
| after tests with $MoS_2$ containing pad | $R_a$ | 0.70 μm |
| | $R_z$ | 5.90 μm |
| with $TiS_2$ containing pad | $R_a$ | 0.80 μm |
| | $R_z$ | 6.40 μm |
| 2. Average wear breadth on the brake pad test bodies. | | |
| $MoS_2$ containing pad | | 2.0 mm |
| $TiS_2$ containing pad | | 2.6 mm |
| 3. Abrasion/temperature diagram. | | |

Figure 10:
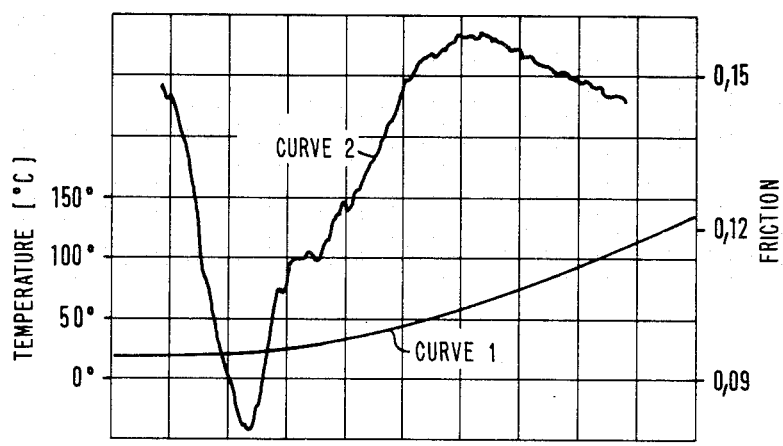
FIG. 10 is a friction/temperature diagram for the $MoS_2$ containing brake pad (disc brake of hardened steel—Rockwell hardness 63)
Figure 11:
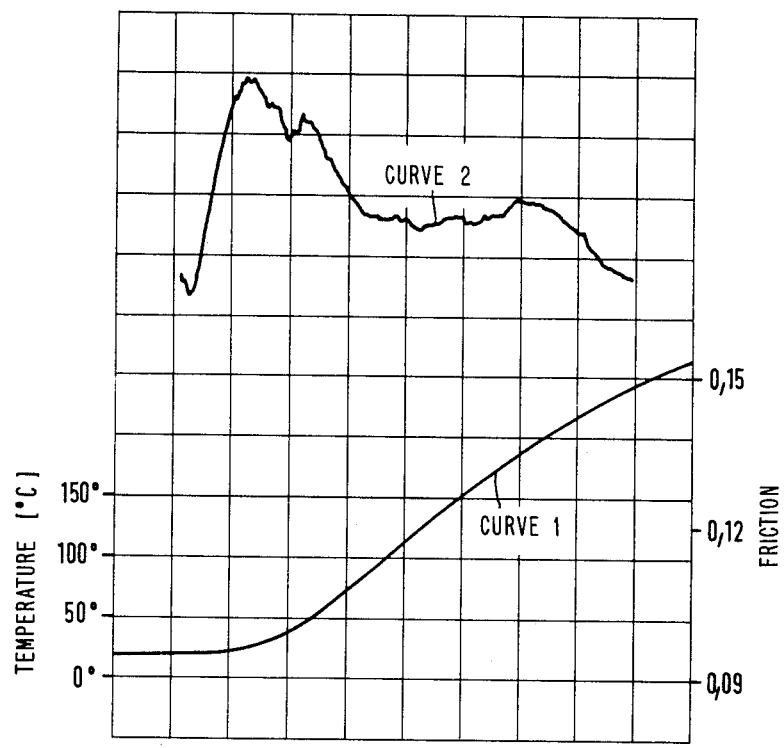
FIG. 11 is the friction/temperature diagram for a $TiS_2$—containing brake pad (brake disc as described in connection with FIG. 10)

FIG. 10 shows the relationship between friction number and temperature with a $MoS_2$ containing pad and FIG. 11 shows the indicated relationship with $TiS_2$ containing pad. In the diagrams there is used a paper advance rate of 1 centimeter in the time of three seconds.

| Curve 1 shows the course of temperature (1 cm ≙ 50° C.); Curve 2 shows the course of the friction number (1 cm ≙ 0.012). |
| --- |

With approximately equal depth of roughness but somewhat more wear the $TiS_2$ pad shows more than 30% higher friction value as well as essentially faster increasing friction values.

These results show that in an emergency braking situation essentially better stopping times are obtained by the invention because the full friction load with a TiS₂ pad is obtained after three seconds whereas in the MoS₂ pad it is obtained after 16.5 seconds.

EXAMPLE 2.3

For the determination of the differences in the friction, wear and temperature behaviour the Lubrimeter was utilized in the following comparative examples:

| Experimental Conditions: | |
|---|---|
| Stage of loading: | 1 (750 N) |
| Rotational speed: | 1400 rpm (equals approximately 1.75 meters per second sliding velocity) |
| Material of the pins: | rust free steel V₂A |
| Material of the rollers: | (A) MoS₂ containing pad (B) TiS₂ containing pad. |

The Lubrimeter was brought at room temperature to the rotational speed. Then the load was applied and after 22.5 seconds running time the load was removed. This test was carried out once with the rollers and once with the pins. After that the test bodies were removed and freshly measured.

The test with the MoS₂ pad had to be interrupted after 17 seconds because of the very rapid wear that took place by the complete using up of the pad and because of the risk of damaging of the Lubrimeter.

Experimental Results

There was again measured the depth of roughness on the pins both before and after the application of the tests, the breadth of the wear on the brake pad test bodies and the friction/temperature diagram was determined

| 1. Depth of roughness on the | | |
|---|---|---|
| pins before abrasion tests | $R_a$ | 1.10 μm |
| | $R_z$ | 0.30 μm |
| After abrasion tests with | $R_a$ | 5.40 μm |
| MoS₂ containing pad | $R_z$ | 28.40 μm |
| with the TiS₂ containing | $R_a$ | 6.60 μm |
| pad | $R_z$ | 35.70 μm |
| 2. Average width of wear on the brake pad test bodies. | | |
| MoS₂ containing pad | | 4.4 mm |
| TiS₂ containing pad | | 4.3 mm |
| 3. Friction/Temperature diagram. | | |

Figure 12:
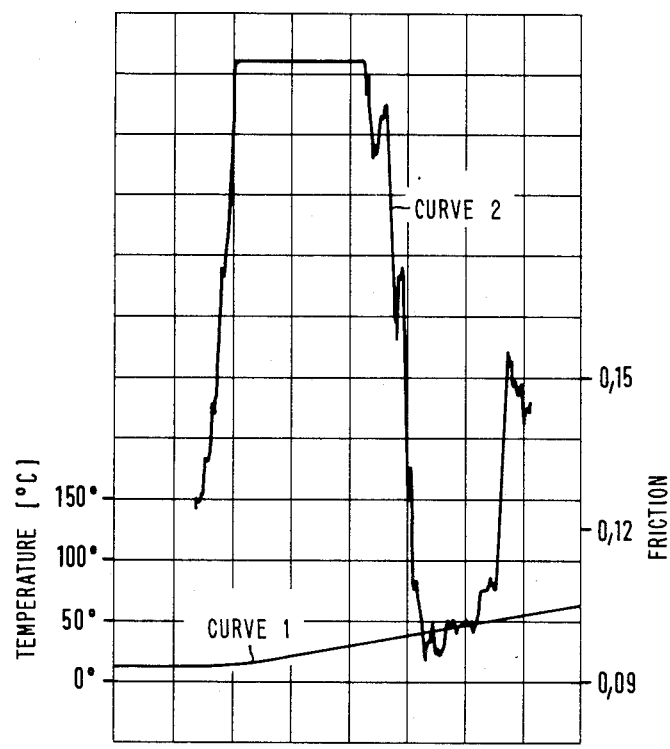
FIG. 12 is an friction/temperature diagram for the $MoS_2$ containing pad (brake disc V$_2$A)
Figure 13:
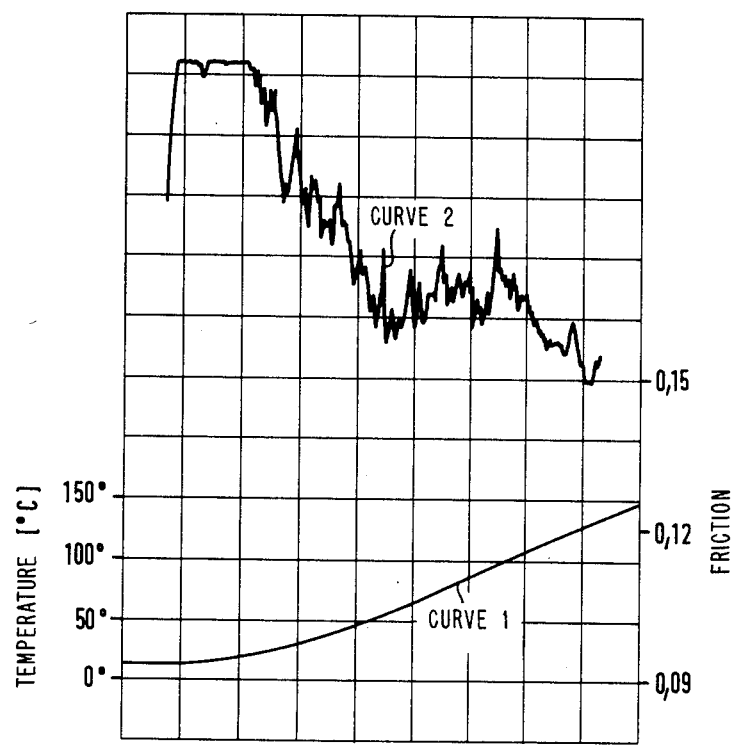
FIG. 13 is an friction/temperature diagram for the $TiS_2$ containing pad (disc brake as described for FIG. 12).

FIG. 12 shows the relationship between the friction number and the temperature with an MoS₂ containing pad and FIG. 13 shows the indicated relationship with the TiS₂ containing pad.

The diagram is based on a paper advanced speed of one centimeter in the time of three seconds.

| Curve 1 shows the course of temperature duration (1 cm = 50° C.); |
|---|
| Curve 2 shows the course of the friction number (1 cm = 0.012). |

By essentially slower wearing away of the pad material, the TiS₂ containing pad demonstrates that it enables a longer performance period of time with constant friction behaviour. A direct comparison of the obtained wear data is however not possible because with the experiment utilizing the MoS₂ containing pad the yet obtainable limiting value on the wear was already obtained after 75% of the running time of the pad containing the TiS₂.

Further variations and modifications of the present invention will become apparent to those skilled in the art from the foregoing description which variations and modifications are intended to be encompassed by the claim depended thereto.

We claim:

1. An additive composition for controlling friction and abrasion in an asbestos free brake pad comprising a sufficient amount of TiS₂, a sulfide of a member of the second subgroup of the Periodic Table, a phosphate of magnesium, calcium, boron, aluminum, copper or iron, and synthetic graphite.

2. An additive according to claim 1 wherein the sulfide is ZnS having a Wurzite structure and the phosphate is Ca₃(PO₄)₂.

3. An additive in accordance with claim 1 further comprising a mixture of the following components:

| 5-30 weight percent | TiS₂ |
|---|---|
| 10-30 weight percent | ZnS (Wurtzite structure) |
| 5-30 weight percent | Ca₃(PO₄)₂ |
| 10-80 weight percent | synthetic graphite. |

4. An additive as set forth in claim 3 wherein the mixture contains:

| 10 to 15 weight percent | TiS₂ |
|---|---|
| 10-30 weight percent | ZnS (Wurtzite structure) |
| 10-15 weight percent | Ca₃(PO₄)₂ |
| 40-70 weight percent | synthetic graphite. |

5. The additive in accordance with claim 4 wherein the mixture contains:

| 8-12% weight percent | TiS₂ |
|---|---|
| 20-25% | ZnS (Wurtzite structure) |
| 8-12 weight percent | Ca₃(PO₄)₂ |
| 51-64 weight percent | synthetic graphite. |

6. A method for controlling friction and abrasion in an asbestos free brake pad comprising adding TiS₂ to a brake pad composition free of asbestos.

7. The method of claim 6 wherein there is further added to the brake pad a sulfide of a member of the second subgroup of the Periodic Table, a phosphate of magnesium, boron, aluminum, copper or iron, and synthetic graphite.

8. The method of claim 5 wherein the sulfide is ZnS having a Wurtzite structure and the phosphate is Ca₃(PO4)₂.

9. In a brake pad, the improvement comprising controlling friction and abrasion by introducing an additive into the mixture for making said brake pad which mixture is asbestos free and which additive contains TiS₂.

10. In the brake pad according to claim 9 which additive further contains a sulfide of a member of the second subgroup of the Periodic Table, a phosphate of magnesium, calcium, borium, aluminum, copper or iron and synthetic graphite.

11. In the brake pad of claim 9 wherein the sulfide is ZnS having a Wurtzite structure and the phosphate is Ca₃(PO₄)₂.

12. In the brake pads according to claim 9 wherein the additive has the following composition:

| | |
|---|---|
| 5–30 weight percent | TiS$_2$ |
| 10–30 weight percent | ZnS (Wurtzite structure) |
| 5–30 weight percent | Ca$_3$(PO$_4$)$_2$ |
| 10–80 weight percent | synthetic graphite. |

13. In the brake pads according to claim 9 wherein the additive has the following composition:

| | |
|---|---|
| 10–15 weight percent | TiS$_2$ |
| 10–30 weight percent | ZnS (Wurtzite structure) |
| 10–15 weight percent | Ca$_3$(PO$_4$)$_2$ |
| 40–70 weight percent | synthetic graphite. |

14. In the brake pads according to claim 9 wherein the additive has the following composition:

| | |
|---|---|
| 8–12 weight percent | TiS$_2$ |
| 20–25 weight percent | ZnS (Wurtzite structure) |
| 8–12 weight percent | Ca$_3$(PO$_4$)$_2$ |
| 51–64 weight percent | synthetic graphite. |

15. An asbestos free brake pad comprising as an additive to control friction and abrasion TiS$_2$ and a brake pad binder free of asbestos.

16. The asbestos free bake pad according to claim 15 wherein said additive contains as additional components a sulfide of a member of the second subgroup of the Periodic Table, a phosphate of magnesium, calcium, boron, aluminum, copper or iron, and synthetic graphite.

17. The asbestos free brake pad according to claim 15 wherein said binder comprises a resin.

18. The asbestos free brake pad according to claim 17 wherein the resin is a phenolic resin.

19. The asbestos free brake pad according to claim 16 wherein the sulfide is ZnS having a Wurtzite structure and the phosphate is Ca$_3$(PO$_4$)$_2$.

20. The asbestos free brake pad according to claim 15 which comprises the mixture of the following component:

| | |
|---|---|
| 5–30 weight percent | TiS$_2$ |
| 10–30 weight percent | ZnS (Wurtzite structure) |
| 5–30 weight percent | Ca$_3$(PO$_4$)$_2$ |
| 10–80 weight percent | synthetic graphite. |

21. The asbestos free brake pad according to claim 15 which comprises the mixture of the following component:

| | |
|---|---|
| 10 to 15 weight percent | TiS$_2$ |
| 10–30 weight percent | ZnS (Wurtzite structure) |
| 10–15 weight percent | Ca$_3$(PO$_4$)$_2$ |
| 40–70 weight percent | synthetic graphite. |

22. The asbestos free brake pad according to claim 21 which comprises the mixture of the following component:

| | |
|---|---|
| 8–12 weight percent | TiS$_2$ |
| 20–25 weight percent | ZnS (Wurtzite structure) |
| 8–12 weight percent | Ca$_3$(PO$_4$)$_2$ |
| 51–64 weight percent | synthetic graphite. |

* * * * *